(12) United States Patent
Ding et al.

(10) Patent No.: US 11,378,686 B2
(45) Date of Patent: *Jul. 5, 2022

(54) ULTRASONIC ECHO PROCESSING IN PRESENCE OF DOPPLER SHIFT

(71) Applicant: TEXAS INSTRUMENTS INCORPORATED, Dallas, TX (US)

(72) Inventors: Lei Ding, Plano, TX (US); Srinath Mathur Ramaswamy, Murphy, TX (US); Anand Dabak, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 399 days.

This patent is subject to a terminal disclaimer.

(21) Appl. No.: 16/232,308

(22) Filed: Dec. 26, 2018

(65) Prior Publication Data
US 2020/0209388 A1  Jul. 2, 2020

(51) Int. Cl.
| | | |
|---|---|---|
| *G01S 17/58* | (2006.01) | |
| *G01S 17/93* | (2020.01) | |
| *G01S 7/53* | (2006.01) | |
| *G01S 15/58* | (2006.01) | |
| *G01S 15/931* | (2020.01) | |

(52) U.S. Cl.
CPC .............. *G01S 15/582* (2013.01); *G01S 7/53* (2013.01); *G01S 15/931* (2013.01)

(58) Field of Classification Search
CPC ........ G01S 7/53; G01S 15/582; G01S 15/104; G01S 15/931
USPC ......................................................... 367/99
See application file for complete search history.

(56) References Cited

U.S. PATENT DOCUMENTS

| | | |
|---|---|---|
| 6,289,282 B1 | 9/2001 | Hassler et al. |
| 8,668,643 B2 | 3/2014 | Kinast |
| 8,982,668 B2 | 3/2015 | Horsky et al. |
| 2002/0047780 A1 | 4/2002 | Nishimoto et al. |

(Continued)

FOREIGN PATENT DOCUMENTS

| | | |
|---|---|---|
| EP | 2737857 A1 | 6/2014 |
| GB | 2534034 A | 7/2016 |

(Continued)

OTHER PUBLICATIONS

Search Report for PCT No. PCT/US19/30895, dated Aug. 22, 2019, 2 pages.

(Continued)

*Primary Examiner* — Daniel L Murphy
(74) *Attorney, Agent, or Firm* — Michael T. Gabrik; Charles A. Brill; Frank D. Cimino

(57) ABSTRACT

An ultrasound detect circuit includes a decimator that decimates a transmit signal to be transmitted through an ultrasonic transducer. The transmit signal is decimated to generate first and second template signals. The decimator uses a different decimation ratio to generate the first template signal than the second template signal. The circuit also includes a first correlator to correlate a signal derived from the ultrasonic transducer with the first template signal, aa second correlator to correlate the signal derived from the ultrasonic transducer with the second template signal, and a Doppler shift determination circuit to determine a Doppler frequency shift based on an output from the first correlator and an output from the second correlator.

20 Claims, 6 Drawing Sheets

(56) References Cited

U.S. PATENT DOCUMENTS

| | | |
|---|---|---|
| 2004/0133104 A1 | 7/2004 | Cohen-Bacrie et al. |
| 2005/0075568 A1 | 4/2005 | Moehring |
| 2005/0088334 A1 | 4/2005 | Herder |
| 2008/0218324 A1 | 9/2008 | Li |
| 2011/0029044 A1 | 2/2011 | Hyde et al. |
| 2012/0120768 A1 | 5/2012 | Horsky et al. |
| 2012/0272738 A1 | 11/2012 | Klessel et al. |
| 2013/0028053 A1 | 1/2013 | Tsuji et al. |
| 2013/0142011 A1 | 6/2013 | Hallek et al. |
| 2014/0155748 A1 | 6/2014 | Pernisa et al. |
| 2014/0219062 A1 | 8/2014 | Rothberg et al. |
| 2014/0331772 A1 | 11/2014 | Klotz et al. |
| 2015/0253123 A1 | 9/2015 | Braker et al. |
| 2015/0323667 A1 | 11/2015 | Przybyla et al. |
| 2016/0044394 A1 | 2/2016 | Derom |
| 2016/0161604 A1 | 6/2016 | Clark |
| 2016/0209493 A1 | 7/2016 | Krasner |
| 2016/0217686 A1 | 7/2016 | Lee |
| 2017/0003391 A1 | 1/2017 | Hallek et al. |
| 2017/0363724 A1 | 12/2017 | Reid |
| 2018/0017671 A1 | 1/2018 | Warke et al. |
| 2018/0203095 A1 | 7/2018 | Xie et al. |
| 2018/0252803 A1 | 9/2018 | Bilik et al. |
| 2019/0025415 A1 | 1/2019 | Suchy et al. |
| 2019/0339386 A1* | 11/2019 | Ding .................. G01S 15/931 |
| 2020/0033462 A1* | 1/2020 | Ding .................. G01S 15/104 |
| 2020/0309945 A1 | 10/2020 | Ding et al. |
| 2020/0400820 A1 | 12/2020 | Nauen |
| 2021/0156995 A1 | 5/2021 | Ding et al. |
| 2021/0302548 A1 | 9/2021 | Chen et al. |

FOREIGN PATENT DOCUMENTS

| | | |
|---|---|---|
| GB | 2539798 A | 12/2016 |
| GB | 2548461 A | 9/2017 |
| WO | 2012016834 A1 | 2/2012 |
| WO | 2012016841 A1 | 2/2012 |
| WO | 2014180609 A1 | 11/2014 |
| WO | 2015039805 A1 | 3/2015 |
| WO | 2015090842 A1 | 6/2015 |
| WO | 2016166763 A2 | 10/2016 |
| WO | 2018210966 A1 | 11/2018 |
| WO | 2019217306 A1 | 11/2019 |

OTHER PUBLICATIONS

Search Report for PCT/US2019/68037, dated Apr. 16, 2020, 2 pages.
Cross-referenced from U.S. Appl. No. 16/426,779, Office Action dated Aug. 31, 2021.
EP Search Report, dated Jan. 26, 2022, Application No. EP 19 90 6212, 2 pages.
IEEE Article, Giannakis e tal.; "Space-Time-Doppler Coding Over Time-Selective Fading Channels With Maximum Diversity and Coding Gains", 2002, 4 pgs.
X-Reference from U.S. Appl. No. 16/364,652, Non-Final Office Action, dated Nov. 29, 2021.

* cited by examiner

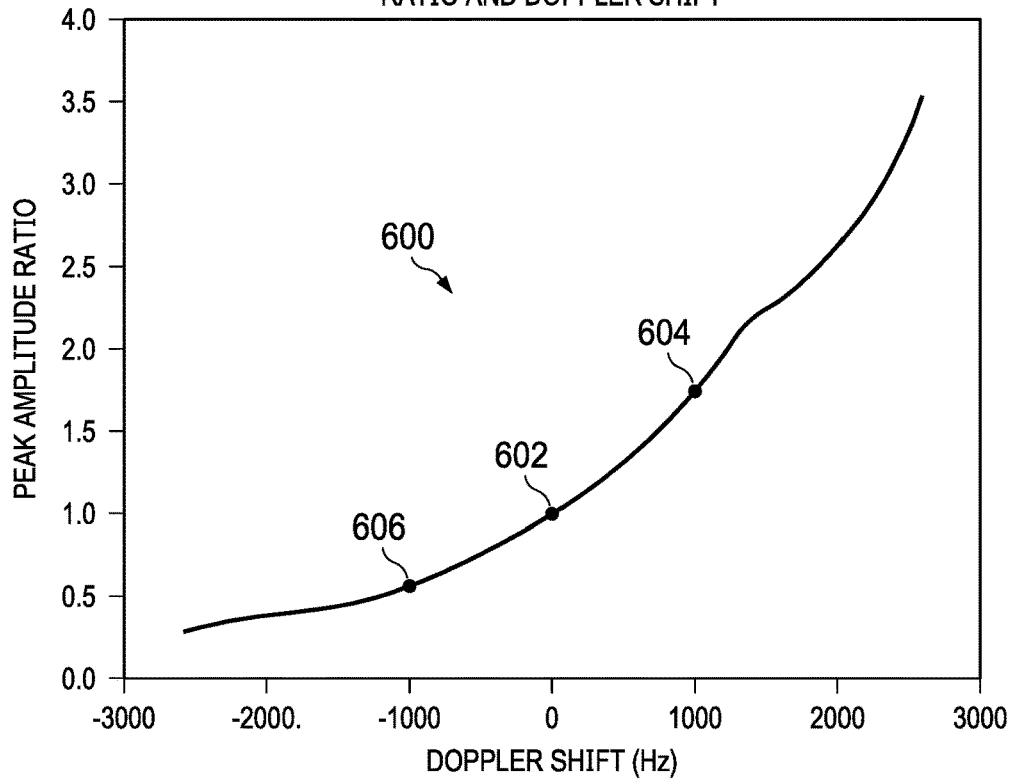
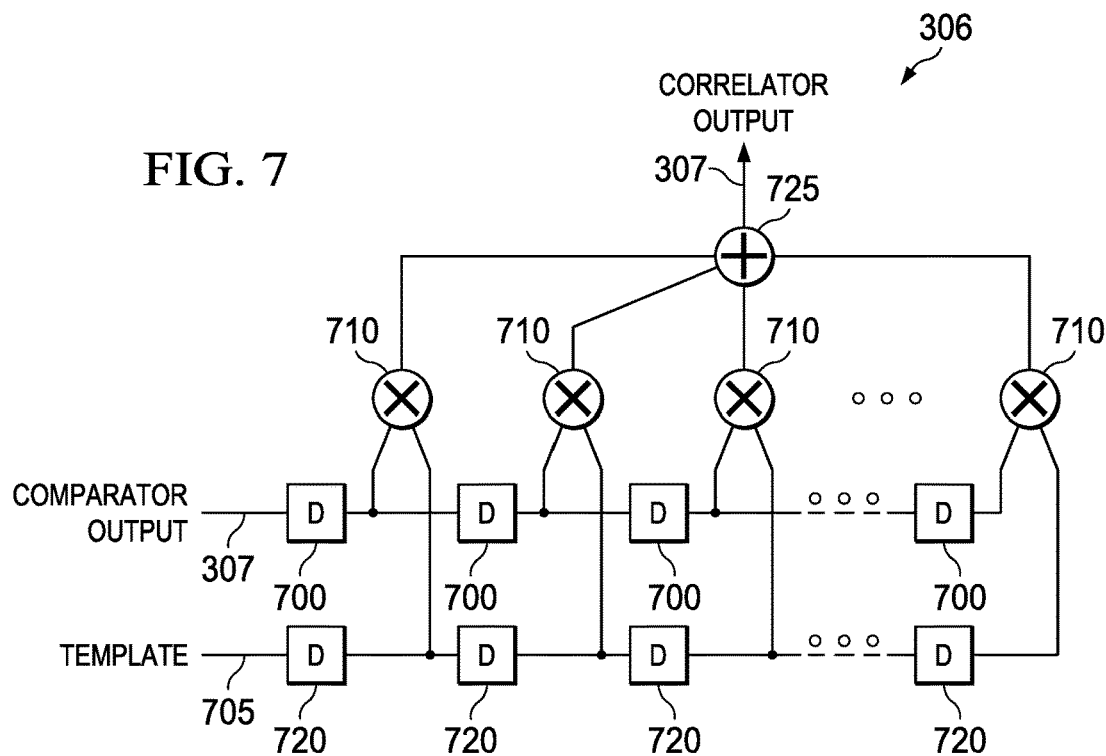

ULTRASONIC ECHO PROCESSING IN PRESENCE OF DOPPLER SHIFT

BACKGROUND

Ultrasonic ranging is used in a variety of applications. For example, in an automotive application, ultrasonic transducers are arranged in the bumper of an automobile. The transducers emit ultrasonic signals. The emitted ultrasonic signals reflect off nearby objects, if such objects are indeed present, and the reflected signals are sensed by the transducers. The round-trip time of the ultrasound signals is measured so that distance to the object can be determined.

SUMMARY

An example of an ultrasound detect circuit includes a decimator that decimates a transmit signal to be transmitted through an ultrasonic transducer. The transmit signal is decimated to generate first and second template signals. The decimator uses a different decimation ratio to generate the first template signal than the second template signal. The circuit also includes a first correlator to correlate a signal derived from the ultrasonic transducer with the first template signal, a second correlator to correlate the signal derived from the ultrasonic transducer with the second template signal, and a Doppler shift determination circuit to determine a Doppler frequency shift based on an output from the first correlator and an output from the second correlator.

BRIEF DESCRIPTION OF THE DRAWINGS

For a detailed description of various examples, reference will now be made to the accompanying drawings in which:

FIG. 6 shows an example of the relationship between the ratio of peaks of correlator waveforms and Doppler shift FIG. 7 illustrates an example of a correlator.

DETAILED DESCRIPTION

As described above, reflected ultrasonic signals are detected by an ultrasonic transducer and used to measure round-trip time to thereby determine distance to the object which reflected the ultrasonic signals. For a zero relative velocity between the ultrasonic transducer and object to reflect the ultrasonic signals (e.g., the automobile is stationary with respect to an object), the round-trip time can be readily and accurately determined. However, for a non-zero relative velocity between the ultrasonic transducer and the object, Doppler shift is created in the received ultrasonic signal. Accordingly, the frequency of the received ultrasonic signals will be different than the frequency of the signals transmitted by the transducer in the first place. As the distance between the transducer and the object increases over time, the frequency of the received ultrasonic signal is lower than that of the transmitted signal, and vice versa. The relative velocity between transducer and object can be due to the automobile moving away from or towards a stationary object, the object may be moving and the automobile may be stationary, or both automobile and object may be in motion.

Figure 1:
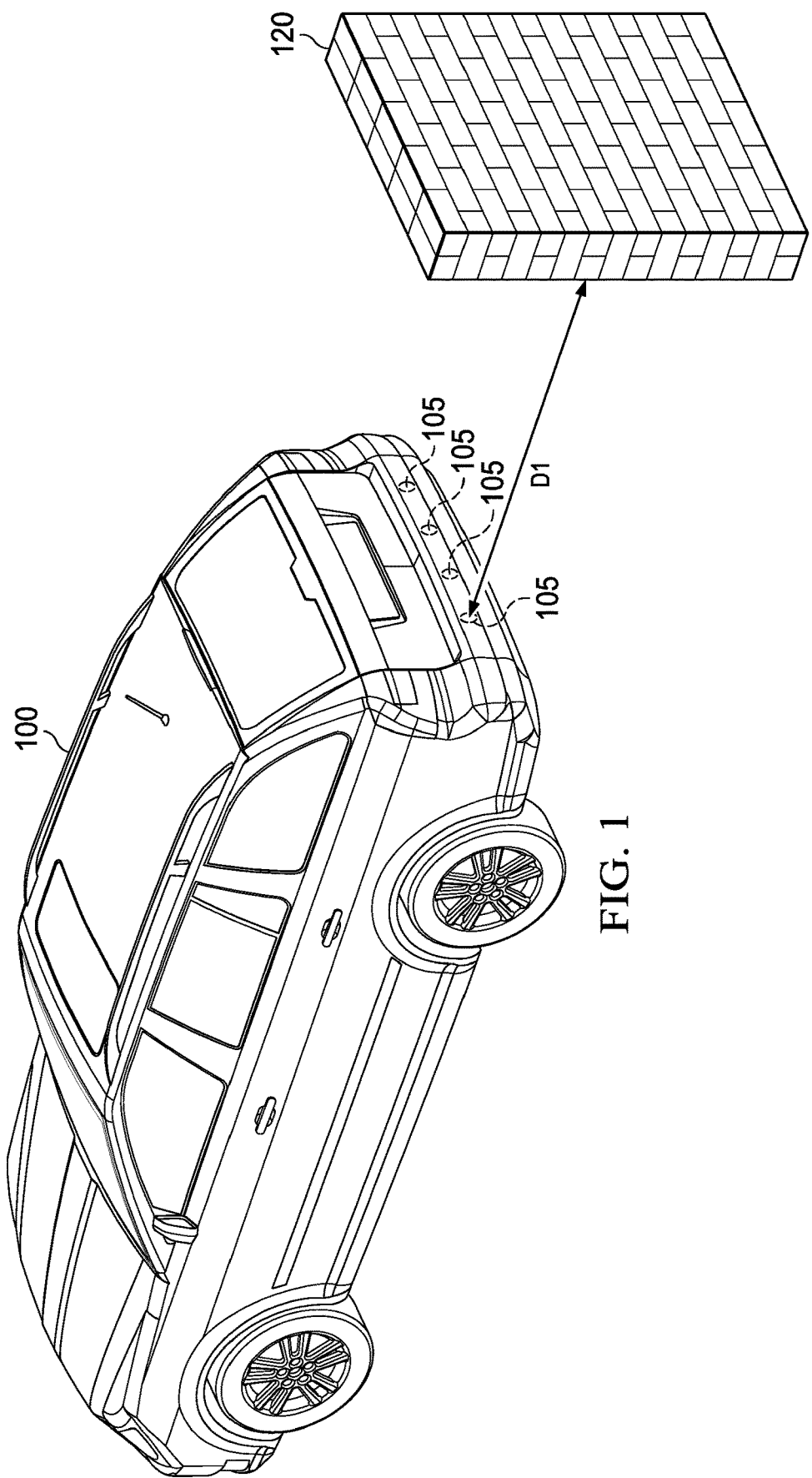
FIG. 1 illustrates an automobile with ultrasonic sensors to measure distance to an object in accordance with the disclosed examples.

As described above, one application for an ultrasonic ranging system is for an automobile, although other applications for the use of distance measuring systems based on ultrasound are possible as well. FIG. 1 illustrates an automobile 100. The automobile includes one or more ultrasonic transducers in either or both of the front and rear bumpers. In the example of FIG. 1, four ultrasonic transducers 105 are shown. The number of transducers in each bumper can be other than four in other examples. The ultrasonic transducers are referred to herein also as transducers for simplicity. In some examples, ultrasonic transducers are used as transducers 105, but in other cases transducers other than ultrasonic transducers can be used. Each ultrasonic transducer emits a sound wave at a specific frequency and then detects a reflection of the sound waves after they have bounced off an object (e.g., object 120) and returned to the transducer. It is known that sound travels through air at about 344 meters/second (1129 feet/second). The elapsed time between when the sound is first emitted from the transducer and when the reflected sound wave is detected back at the transducer can be measured by circuitry coupled to the transducer. The total round-trip distance is the product of speed of sound and the measured time. The distance between the transducer and an object (e.g., D1 in FIG. 1) is then given by:

$$\text{distance} = \frac{\text{speed of sound} \times \text{time}}{2}$$

Although any of a wide range of frequencies can be used for the sound waves (also referred to herein as "sound signals") generated by the transducers 105, in some examples, the sound waves have a frequency(ies) that is above the frequencies which humans can typically hear. For example, the sound waves may have frequencies above 20,000 Hz, although frequencies below 20,000 Hz are possible as well. In one example, the frequency is 50 kHz and the emitted sound waves comprise a number of pulses (e.g., 15-20 pulses) of the 50 kHz signal.

In some implementations, the transducers 105 emit the same frequency (e.g., 50 kHz) but do so in sequential fashion, that is, one transducer 105 emits a sound signal and waits for a predetermined period of time for a reflection before the next transducer 105 is permitted to emit its sound signal. In other implementations, a different signal signature is implemented by each transducer 105. For example, a 50 kHz signal can be modulated in a unique way (e.g., using frequency modulation) for use by each transducer. In one example, the frequencies used to generate a given sound burst (also called a "chirp") may range between a first frequency and second frequency and thus have a difference referred to as Δf. Accordingly, all of the transducers 105 can emit their sound signals simultaneously. As each emitted sound signal is uniquely coded for a specific transducer 105, the reflected sounds signals are unique as well and are readily differentiated by the circuitry connected to each transducer.

The disclosed examples are directed to an ultrasonic sensing system that can determine the Doppler shift for an object that is moving relative to the ultrasonic transducer. The system determines the round-trip time of the sound waves between the transducer and the object, determines the Doppler shift and corrects the measured time for the Doppler shift. The measured Doppler shift also or alternatively can be used to generate a message, alert, announcement, etc. that an object is drawing nearer the sensor or is moving away from the sensor.

Figure 2:
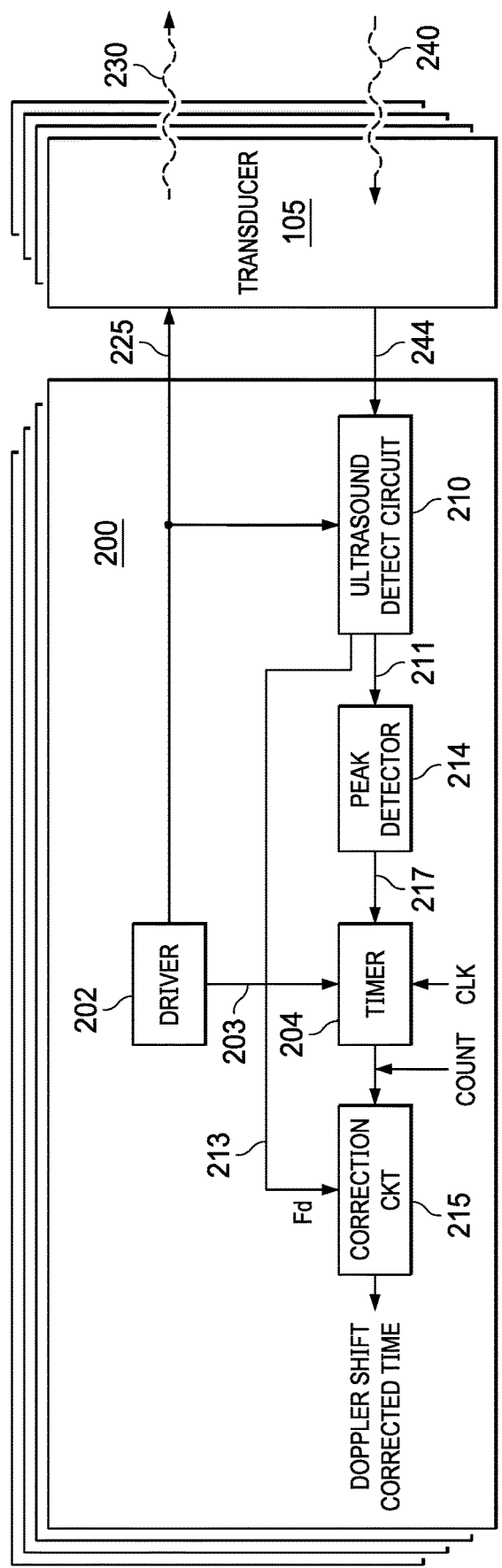
FIG. 2 is a block diagram of ultrasonic transducers and corresponding circuitry in accordance with the disclosed examples.

FIG. 2 illustrates multiple transducers 105, with each transducer 105 coupled to a corresponding ultrasonic sensing circuit 200 that operates the respective transducer. The ultrasonic sensing circuit 200 includes a driver 202. The driver 202 generates an electrical signal 225 which is then converted to a sound signal 230 by the transducer 105. The driver 202 also asserts a control signal 203 to a timer 204 to initiate the timer 204 to measure time. In one example, the timer 204, when initiated by control signal 203, counts pulses of a periodic clock signal (CLK). Each transducer 105 also can receive a sound signal 240 (e.g., a sound signal reflected by object 120) and convert the received sound signal 240 to an electrical signal 244. An ultrasound detect circuit 210 receives and processes the electrical signal 244 (which is indicative of the reflected sound signal 240). The ultrasound detect circuit 210 processes electrical signal 244 to determine when a reflected sound signal has been received by the transducer 105. In response to determining that a reflected sound signal has been received by the transducer, the ultrasound detect circuit 210 generates an output signal 211 to a peak detector 214. A signal indicative of the peak detected in signal 211 is then used as a control signal 217 to the timer 204 to cause the timer to cease measuring time (e.g., cease counting pulses of the periodic clock signal). The count value (COUNT) of the timer 204 thus is indicative of the time that elapsed between when the sound signal 230 was emitted by the transducer 105 and when a reflected sound signal 240 was received by the transducer. The count value of the timer 204 thus is indicative of distance to the object.

The ultrasound detect circuit 210 also determines a Doppler frequency (Fd) associated with the reflected sound signal. The ultrasound detect circuit 210 generates a signal 213 indicative of the Doppler frequency. Signal 213 may encode or otherwise be indicative of Fd. In this example, the ultrasonic sensing circuit 200 also includes a correction circuit 215 which corrects the time measurement (COUNT) from the timer 204 based on the Doppler frequency Fd determined by the ultrasound detect circuit. The Doppler shift corrected time value from the correction circuit 215 can be used to, for example, determine distance D1 to the object in the face of Doppler shift caused by a non-zero relative velocity between transducer 105 and object 120, to indicate whether the distance to an object is becoming smaller or larger, etc.

Figure 3:
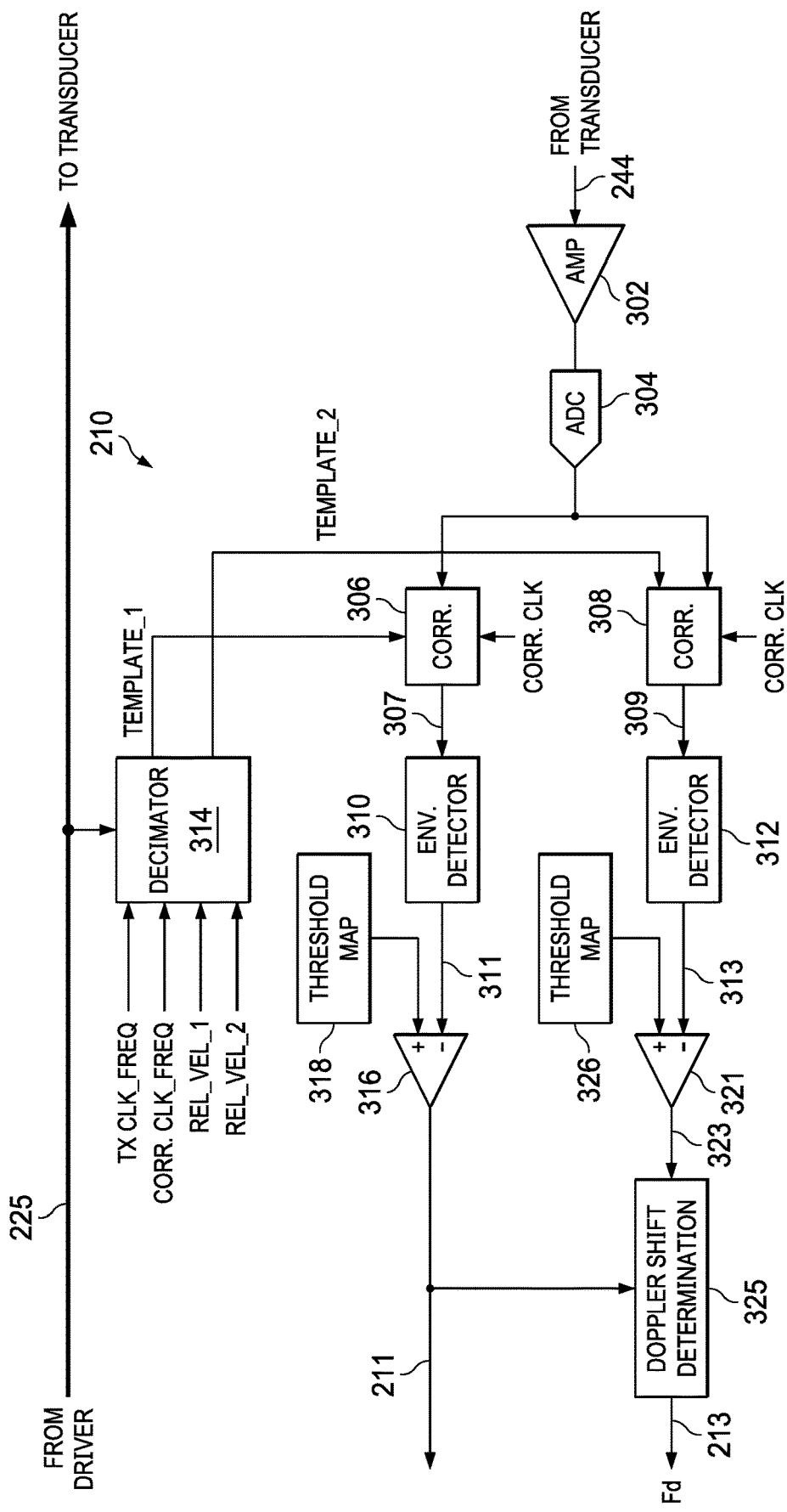
FIG. 3 shows a portion of the circuitry usable with ultrasonic transducers in accordance with disclosed examples.

FIG. 3 shows an example implementation of the ultrasound detect circuit 210. In this example, the ultrasound detection circuit 210 includes an amplifier 302, an analog-to-digital converter (ADC) 304, correlators 306 and 308, envelope detectors 310 and 312, a decimator 314, comparator 316 and 321, threshold maps 318 and 326, and a Doppler shift determination circuit 325. The amplifier 302 amplifies the incoming signal 244 from the transducer 105 and provides the amplified signal to the ADC 304 which then converts the analog amplified signal to a digital representation. The digital representation from the ADC 304, which comprises a signal derived from the transducer 105, is then correlated by the correlator 306 with a template signal TEMPLATE_1 generated by the decimator 314 to produce a correlator output signal 307. Similarly, the correlator 308 correlates the digital representation from the ADC 304 with a template signal TEMPLATE_2 also generated by the decimator 314 to produce a correlator output signal 309. Through use of, for example, the envelope detectors 310 and 312, the Doppler shift determination circuit 325 determines a Doppler frequency shift based on the output signals 307 and 309 from the correlators 306 and 308.

Envelope detector 310 generates an output signal 311 that corresponds to an envelope of the output signal 307 from correlator 306. Envelope detector 312 generates an output signal 313 that corresponds to an envelope of the output signal 309 from correlator 306. In this example, the output signal 311 from envelope detector 310 is compared to a threshold map 318 by comparator 316 to produce a comparator output signal 317 and the output signal 313 from envelope detector 312 is compared to a threshold map 326 (which may be the same as threshold map 318) by comparator 321 to produce a comparator output signal 323. The threshold maps 318 and 326 define time-varying thresholds that indicate valid objects when the signal envelope is above the threshold. In some examples, threshold map 326 is the same as threshold map 318. The threshold is set to be above the expected noise or false echoes at a given distance. For example, the threshold map 318 can be defined to avoid false detection of objects. If the output signal 311 from envelope detector 310 exceeds the signal from the threshold map, then the comparator output signal 211 is asserted as an indication that an object has been detected at that moment in time. As described above, an assertion of signal 211 is used to stop timer 204 in FIG. 2 to thereby generate an estimate of the round-trip time of the ultrasonic signal. An estimate of the distance D1 can then be made based on the count output from timer 204 as described above.

The Doppler shift determination circuit 325 determines a Doppler frequency Fd based on the output signals 307 and 309 from the correlators 306 and 308. In one example, the Doppler shift determination circuit 325 determines the Fd based on the ratio of the output signal 311 from envelope detector 310 to the output signal 313 from envelope detector 312. The ratio can be computed as the peak of the signal 311 divided by the peak of the signal 313 (or vice versa). The correction circuit 215 (FIG. 2) uses the Doppler frequency Fd to correct the measured time value.

For a transmitted sound signal x(t), the received echo is y(t)=x(t t_d). For a static $$t_d = \frac{2*R0}{c},$$

object 120 (i.e., the object is not moving relative to the transducer 105), where R0 is the distance and c is the speed of sound (e.g., 344 meters/second (1129 feet/second). For a moving $$t_d = \frac{2*R0 + 2vt}{c},$$

object with a constant velocity v relative to the transducer 105, where R0 is the distance at time t=0. The main concern is with the effect of the Doppler shift on the echo and thus for analysis purposes, R0 can be set equal to 0. Therefore, the received signal with a Doppler shift can be represented as:

$$y(t) = x\left(t - \frac{2vt}{c}\right)$$

$$y(t) = x\left[\left(1 - \frac{2v}{c}\right)\right]t$$

The transmit clock frequency from the driver (i.e., the frequency of the driver's signal to the transducer) is a higher frequency than the clock frequency of the correlator (CORR CLK in FIG. 3). The decimator 314 decimates the electrical signal 225 from the driver 202 to produces TEMPLATE_1 and TEMPLATE_2. These 2 templates are generated using different decimation ratios and the decimation ratio used to generate each template is based on an assumed relative velocity between an object and the transducer 105. Inputs to the decimator include the transmit clock frequency (TX CLK FREQ), the correlator clock frequency (CORR CLK FREQ), and a relative velocity value to be used for each of the templates (REL_VEL_1 an REL_VEL_2 in the example of FIG. 3). These values may be programmed into the ultrasonic sensing system 200. In one example, any or all of TX CLK FREQ, CORR CLK FREQ, REL_VEL_1 and REL_VEL_2 are programmed into one or more registers within the ultrasonic sensing system 200.

In one example REL_VEL_1 may be of the same absolute value as REL_VEL_2 but have a different sign. For example, REL_VEL_1 may be +15 km/h while REL_VEL_2 is −15 km/hr. The positive velocity can mean that the object 120 and transducer 105 are moving away from each other while the negative velocity can mean that the object and transducer are moving toward each other, or vice versa. The absolute values of the relative velocities need not be the same. For example, REL_VEL_1 may be +20 km/h while REL_VEL_2 is −15 km/hr. In yet another example, the sign of both relative velocities may be the same and their magnitudes are different.

Figure 4:
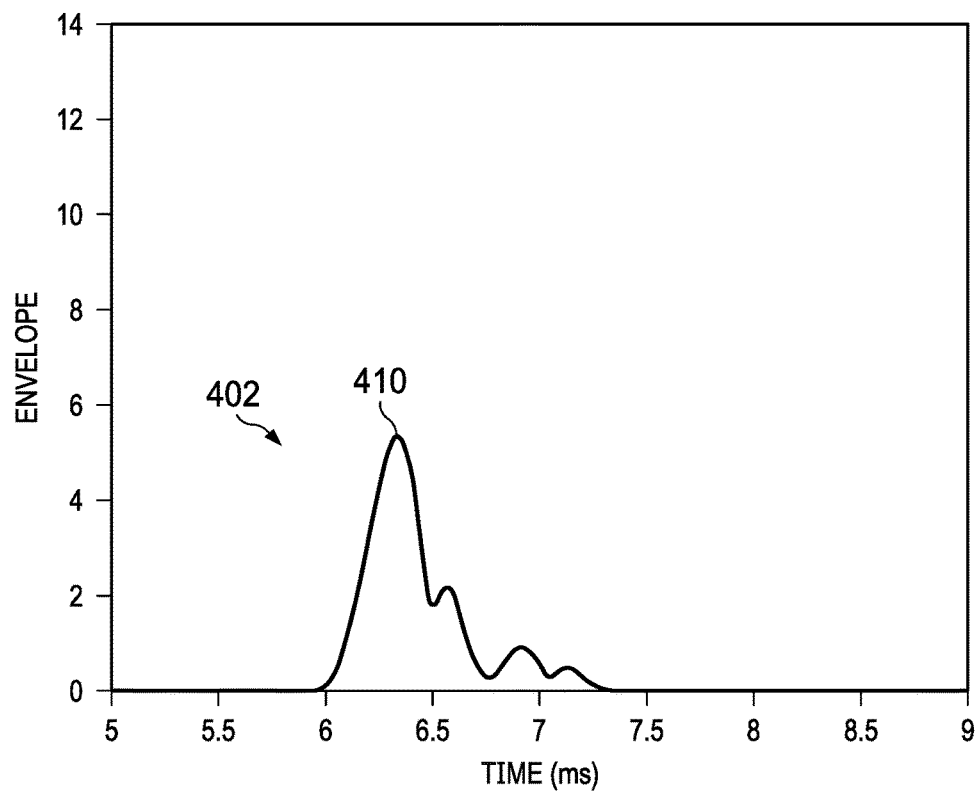
FIGS. 4 and 5 illustrate envelope waveforms from two different correlators using two different templates.
Figure 5:
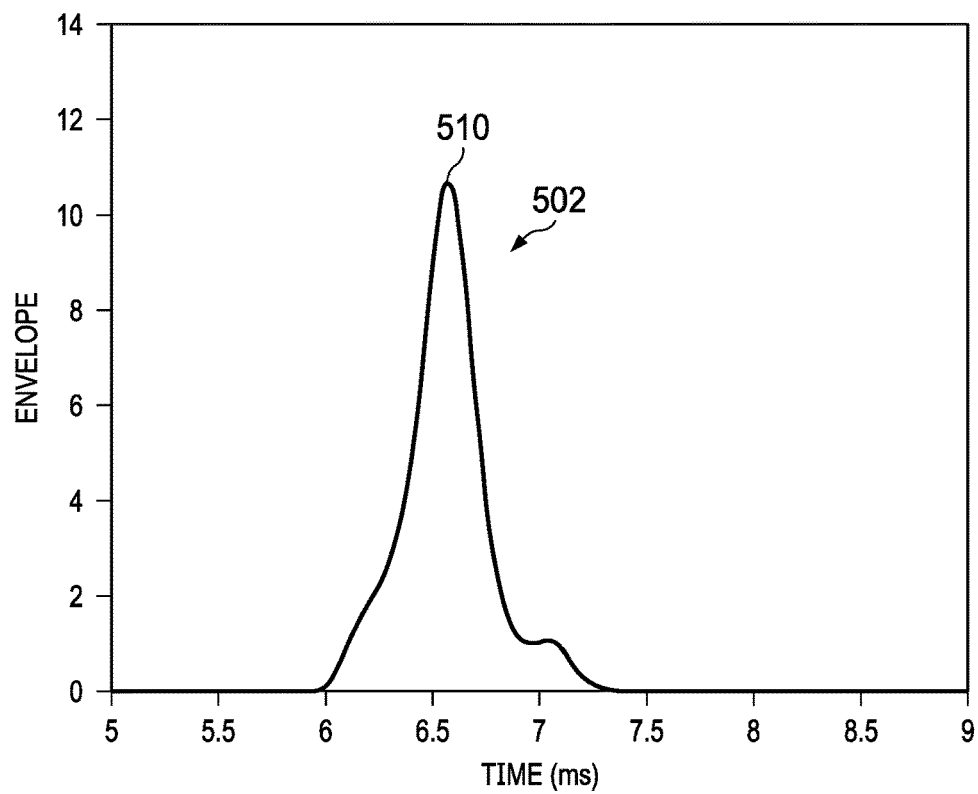

The decimation ratio for each template generated by the decimator 314 is given by:

$$\text{decimation ratio} = \frac{TX\ CLK\ FREQ}{COOR\ CLK\ FREQ} * \frac{1}{1 - \frac{2v}{c}}$$

where v is the relative velocity to be used for a give template. FIGS. 4 and 5 provide examples of the output signals from the envelope detectors 310 and 312 when a different template is used for each of the correlators 306 and 308. The envelope waveform 402 of FIG. 4 may represent the output signal 311 from envelope detector 310 while the envelope waveform 502 of FIG. 5 may represent the output signal 313 from envelope detector 312. The template TEMPLATE_1 provided to correlator 306 was determined based on a different relative velocity (e.g., REL_VEL_1) than was used to generate the template TEMPLATE_2 provided to correlator 308 (e.g., REL_VEL_2). Each envelope waveform 402, 502 has a different peak amplitude 402 and 502, respectively, because the received signal correlated to each of the templates resulted from an example in which there was a non-zero relative velocity between object and transducer that was closer to the relative velocity used to generate one template versus the other. In the example of FIGS. 4 and 5, the peak amplitude 510 in FIG. 5 is higher than that of the peak amplitude 410 of FIG. 4. This difference indicates that the signal received by transducer 105 pertained to a non-zero relative velocity between object and transducer that was closer to the relative velocity used to generate TEMPLATE_2 for correlator 308 than for TEMPLATE_1 for correlator 306.

The location of the peak in the envelope waveforms can be determined based on whether an up-chirp or a down-chirp is implemented. In an up-chirp, the frequency of the ultrasound signal increases and in a down-chirp, the frequency decreases. For a linear up-chirp (frequency increases linearly with respect to time), the location of the peak in time relative to the start of the echo can be determined as $$N\frac{1}{Ft}\left(1 - \frac{Fd - Fm}{\Delta f}\right)$$

where N is the number of pulses that form each ultrasonic sound burst, Ft is the transducer frequency, Fm is the frequency shift associated with the relative velocity used to generate the corresponding template and Δf is the range of frequencies used to generate each ultrasonic chirp signal. Fm is selected to cover the desired Doppler frequency range. For example, if the Doppler frequency range is from −Δ/2 to +Δf/2, Fm can be set to coincide with Δf/4, and another value of Fm at −Δf/4. In the linear up-chirp case, when there is a positive Doppler shift Fd, the envelope peak is present at an earlier time (assuming the positive sign means the object and transducer are becoming closer together). Conversely, for a negative Doppler shift, the envelope peak will be present at a later time.

For a linear down-chirp, the location of the peak in the envelope waveforms can be $$N\frac{1}{Ft}\left(1 + \frac{Fd - Fm}{\Delta f}\right).$$

determined as In the linear down-chirp case, when there is a positive Doppler shift Fd, the envelope peak is present at a later time (assuming the positive sign means the object and transducer are becoming closer together). Conversely, for a negative Doppler shift, the envelope peak will be present at an earlier time.

One way to estimate the Doppler frequency Fd is to transmit one linear up-chirp signal, $$TOF1 = TOF\_object + N\frac{1}{Ft}\left(1 - \frac{Fd - Fm}{\Delta f}\right).$$

calculate a time of flight (TOF1) as TOF1=TOF_object+ Then one linear down-chirp signal can be transmitted and a second time of flight (TOF2) can be calculated as $$TOF2 = TOF\_object + N\frac{1}{Ft}\left(1 + \frac{Fd - Fm}{\Delta f}\right).$$

Subtracting TOF1 from TOF2 results in:

$$N\frac{2}{Ft}\frac{Fd}{\Delta f} = TOF2 - TOF1$$

Because N, Ft, and Δf are known, Fd can readily be calculated. However, this approach assumes that the object is relatively stationary during the two time of flight measurements.

If the template is shifted by a positive frequency Fm, the envelope peak will appear at a later time, and if the template is shifted by a negative frequency Fm, the envelope peak will appear at an earlier time. By using multiple templates, each determined using a different relative velocity and thus a different Doppler shift, the ratio of the peaks of correlators' outputs can be represented as:

$$\alpha = \frac{\Delta f - |Fd - Fm1|}{\Delta f - |Fd - Fm2|}$$

where α is the ratio of the peaks, Fm1 is the Doppler shift frequency corresponding to the relative velocity used to generate TEMPLATE_1 and Fm2 is the Doppler shift frequency corresponding to the relative velocity used to generate TEMPLATE_2. In the equation above, Δf, Fm1, and Fm2 are known, and thus the ratio of the envelope peaks is a function of the Doppler shift. FIG. 6 shows an example 600 of the relationship between the ratio of the peak amplitudes and Doppler shift. If the ratio is 1 as indicated at 602, which means the peak amplitudes are the same, the corresponding Doppler shift is 0. A ratio of, for example, 1.75 (604) corresponds to a positive Doppler shift of 1 and a ratio of 0.6 corresponds to a negative Doppler shift of −1 KHz.

The curve, such as that shown in FIG. 6, can generally be divided into three sections (Fd>=Fm1, Fm1>Fd>=Fm2, and Fd<Fm2). These three sections of the curve can be used to calculate Fd as follows (assuming Fm1=Fm and Fm2=−Fm).

$$f_D = \begin{cases} \Delta f - \frac{\alpha+1}{\alpha-1} f_M & \alpha \geq \frac{\Delta f}{\Delta f - 2f_M} \\ \frac{\alpha-1}{\alpha+1}(\Delta f - f_M) & \frac{\Delta f}{\Delta f - 2f_M} > \alpha \geq \frac{\Delta f - 2f_M}{\Delta f} \\ -\Delta f - \frac{\alpha+1}{\alpha-1} f_M & \alpha < \frac{\Delta f - 2f_M}{\Delta f} \end{cases}$$

The relationship between peak amplitude ratio and Doppler shift can be determined a priori and programmed into storage in the ultrasonic sensing system 200 as, for example, a look-up table.

Referring again to FIG. 3, Doppler shift determination circuit 325 receives the envelope detector output signals 311 and 313, determines the peaks from the envelope detectors' output signals, and computes the ratio of the peaks. The ratio can then be used to determine the Doppler frequency Fd using a look-up table or other structure or mechanism implemented in the Doppler shift determination circuit 325 to derive the Doppler frequency from the ratio.

The correction circuit 215 corrects the count value from the timer 204 by adding to or subtracting from the timer count value an amount of time (or value representative of the amount of time) derived from the Doppler frequency Fd. In one example, the amount of time to add or subtract is determined by the correction circuit as $$\Delta T = N \left( \frac{F_d}{\Delta f} \right)$$

for a linear up-chirp signal and $$\Delta T = -N \left( \frac{F_d}{\Delta f} \right)$$

for a linear down chirp signal.

When enabled, Doppler time of flight (TOF) compensation can be used to apply peak location compensation based on the Doppler information. In some examples, an enable signal can be configured through an internal register accessible by a serial interface. The enable signal can be used to enable Doppler TOF compensation. TOF is the estimated time of flight from peak locations.

For a linear up chirp (i.e., frequency increase during the chirp), ToF+N*1/Ft*(Fd−Fm)/Δf For a linear down-chirp (i.e., frequency decrease during the chirp), ToF−N*1/Ft*(Fd−Fm)/Δf FIG. 7 shows an example of correlator 306, although the example implementation can be used for correlator 308 as well. In this example, the correlator 306 includes a series of delay buffers 700 through which the ADC 304 output flows, and a series of corresponding delay buffers 720 through which TEMPLATE_1 flows. Each delay buffer 700, 720 may implement the same amount of time delay as the other delay buffers. The output of corresponding delay buffers 700, 720 are then multiplied together as shown by multipliers 710, and the outputs of the multipliers 710 are then summed together by an adder 725 to produce the correlator output 307. The correlator output 307 at a given instant of time is a multi-bit digital signal that indicates how closely the received sound signal 244 (e.g., output of ADC 304) matches the expected sound signal based on the transmitted sound signal 230 at that particular instant of time.

Figure 8:
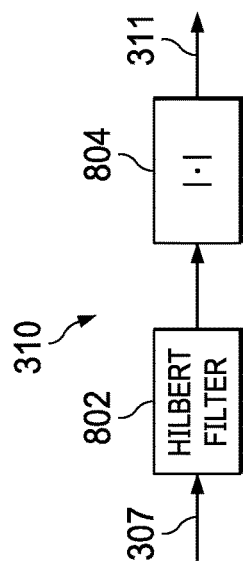
FIG. 8 shows an envelope detector in accordance with an example.

The correlator outputs 307 and 309 are provided to envelope detectors 310 and 312, respectively. Each envelope detector generates an output signal that generally tracks the envelope (e.g., the peaks) of its corresponding comparator's output. FIG. 8 shows an example implementation of envelope detector 310, although the example implementation can be used for envelope detector 312 as well. This envelope detector example includes a Hilbert filter 802 and an absolute value circuit 804. For a real input signal xr, the Hilbert filter generates a complex analytic signal, xr+j*xi, where j= $\sqrt{-1}$, and xi is the signal xr with 90 degree phase shift. The absolute value of the complex analytic signal, |xr+j*xi|, is defined as $\sqrt{xr^2 + xi^2}$, which is the envelope of the signal xr.

More than two correlators can be implemented in some examples. If there are, for example, three correlators, the ratio between the peak values of correlator 1 and 2 can be calculated to obtain one value of Fd. The ratio between the peak values of correlator 2 and 3 can be calculated to obtain another value of Fd. The final estimate of Fd is the average of the two values.

Figure 9:
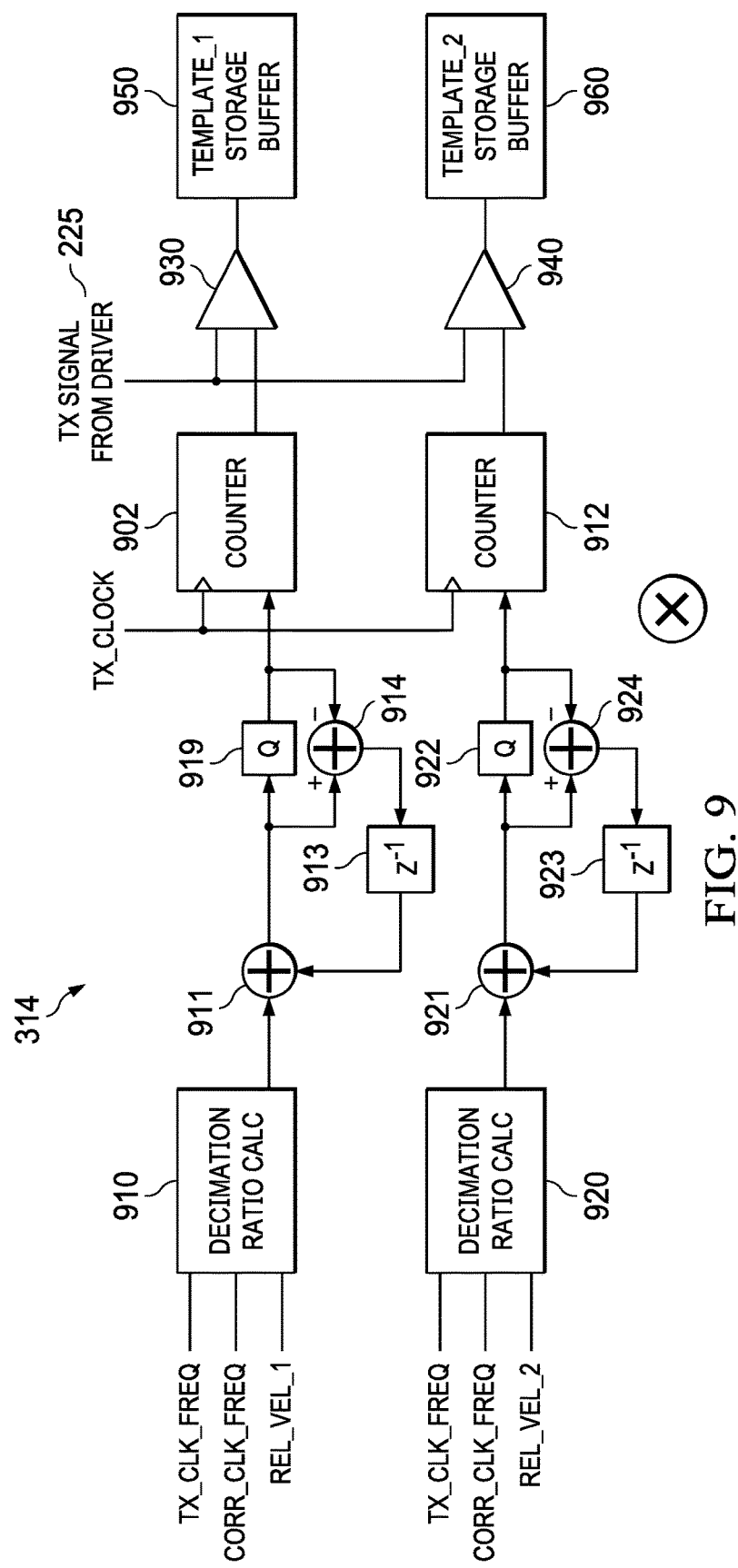
FIG. 9 shows an example of a decimator.

FIG. 9 shows an example of decimator 314. The example decimator of FIG. 9 includes counters 902 and 912, decimation ratio calculators 910 and 920, tristate buffers 930 and 940 and TEMPLATE_1 storage buffer 950 and TEMPLATE_2 storage buffer 960. Associated with decimation ratio calculator 910 are adders 911 and 914, a quantizer (Q) 919 (a rounding function whose output is an integer), and an inverse Z transform circuit 913 (which represents a unit sample delay for the upcoming signal and thus also referred to as a delay element). Similarly, associated with decimation ratio calculator 920 are adders 921 and 924, a Q 922, and an inverse Z transform circuit 923.

Decimation ratio calculator 910 calculates the decimation ratio for TEMPLATE_1 and decimation ratio calculator 920 calculates the decimation ratio for TEMPLATE_2. The output of each decimation ratio calculator 910, 920 is used as the counter period for each of the corresponding counters 902, 912. The output of each decimation ratio calculator 910, 820 may be used to configure an initial or terminal count value for each counter. The counters may be count-up or count-down counters. Each counter 902, 912 counts edges of the transmitter clock (TX_CLOCK) which is internal to the driver 202 and whose frequency is TX_CLK_FREQ. Each counter counts from initial count value to a terminal count value. Upon occurrence of the terminal count value, the respective counter 902, 912 asserts an output signal (e.g., a pulse) that causes the corresponding tristate buffer 930 to pass the current state of the electrical signal 225 from the driver 202 to the corresponding template storage buffer 950, 960. TEMPLATE_1 is provided by the TEMPLATE_1 storage buffer 950 and TEMPLATE_2 is provided by the TEMPLATE_2 storage buffer 960.

The decimation ratio can be an integer or a fractional number. As a fractional number, the period of the counter cannot be used. Instead, the adders 911/914, Q 919 and inverse Z transform circuit 913 are used to round the decimation ratio to an integer value while keeping the error signal through the delay loop and adding the error signal to the next counter value. For example, if decimation ratio is 40.5, the desired counter periods would be 41, 40, 41, 40, 41, 40, etc.

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors.

Modifications are possible in the described embodiments, and other embodiments are possible, within the scope of the claims.

What is claimed is:

1. An ultrasonic sensing system, comprising:
    a decimator adapted to be coupled to an ultrasonic transducer, the decimator being configured to generate first and second template signals by decimating a transmit signal for transmission through the ultrasonic transducer, the first template signal being generated by the decimator using a first decimation ratio, and the second template signal being generated by the decimator using a second decimation ratio that is different from the first decimation ratio;
    a first correlator coupled to the decimator, the first correlator configured to generate a first output signal by correlating the first template signal with a received signal derived from the ultrasonic transducer;
    a second correlator coupled to the decimator, the second correlator configured to generate a second output signal by correlating the signal derived from the ultrasonic transducer with the second template signal; and
    a Doppler shift determination circuit configured to determine a Doppler frequency shift based on the first and second output signals.

2. The ultrasonic sensing system of claim 1, wherein the Doppler shift determination circuit is configured to determine a ratio of a peak of the first output signal to a peak of the second output signal.

3. The ultrasonic sensing system of claim 2, wherein the Doppler shift determination circuit is configured to determine the Doppler frequency shift based on the ratio.

4. The ultrasonic sensing system of claim 1, further including:
    a first envelope detector coupled to the first correlator, the first envelope detector is configured to generate an output signal representative of an envelope of the first output signal; and
    a second envelope detector coupled to the second correlator, the second envelope detector is configured to generate an output signal representative of an envelope of the second output signal.

5. The ultrasonic sensing system of claim 4, wherein the Doppler shift determination circuit is configured to determine the Doppler frequency shift based on the ratio of peaks of the output signals of the first and second envelope detectors, and the ultrasonic sensing system further includes a timer and a correction circuit configured to correct an output of the timer based on the ratio.

6. The ultrasonic sensing system of claim 1, wherein the decimator is configured to decimate the transmit signal based on at least one of a frequency of the transmit signal, a clock frequency for the first and second correlators, a first relative velocity, or a second relative velocity.

7. The ultrasonic sensing system of claim 1, wherein the decimator is configured to decimate the transmit signal based on a frequency of the transmit signal, a clock frequency for the first and second correlators, a first relative velocity, and a second relative velocity.

8. The ultrasonic sensing system of claim 7, wherein the first relative velocity is a positive value and the second relative velocity is a negative value.

9. An apparatus, comprising:
    a decimator configured to decimate a transmit signal to generate a plurality of template signals, each template signal generated by the decimator using a decimation ratio different from that used to generate another of the template signals; and
    a plurality of correlators coupled to the decimator, each of the plurality of correlators corresponding to a respective template signal and each of the plurality of correlators configured to correlate a signal derived from an ultrasonic transducer with its respective template signal.

10. The apparatus of claim 9, wherein the decimator is configured to:
    decimate the transmit signal to generate the first template signal based on a frequency of the transmit signal, a clock frequency for the first and second correlators, and a first relative velocity; and
    decimate the transmit signal to produce the second template signal based on the frequency of the transmit signal, the clock frequency for the first and second correlators, and a second relative velocity, the second relative velocity being different than the first relative velocity.

11. The apparatus of claim 9, further comprising a Doppler shift determination circuit configured to determine a Doppler frequency shift based on a peak of an output from the first correlator and a peak of an output from the second correlator.

12. The apparatus of claim 9, further comprising a Doppler shift determination circuit configured to determine a Doppler frequency shift based on a ratio of peaks of outputs from two of the correlators.

13. The apparatus of claim 9, further comprising:
a plurality of envelope detectors, each of the plurality of envelope detectors is coupled to a respective correlator;
a Doppler shift determination circuit coupled to the plurality of envelope detectors, the Doppler shift determination circuit configured to generate a signal indicative of a Doppler shift of the signal derived from the ultrasonic transducer;
a timer configured to determine an elapsed time; and
a correction circuit coupled to the Doppler shift determination circuit, the correction circuit configured to correct the elapsed time determined by the timer based on the signal indicative of the Doppler shift.

14. The apparatus of claim 9, wherein the first relative velocity is a positive value, and the second relative velocity is a negative value.

15. A method, comprising:
decimating a transmit signal to be transmitted through an ultrasonic transducer using a first decimation ratio to generate a first template signal;
decimating the transmit signal using a second decimation ratio, different from the first decimation ratio, to generate a second template signal;
correlating a signal derived from the ultrasonic transducer with the first template signal to generate a first correlated output;
correlating the signal derived from the ultrasonic transducer with the second template signal to generate a second correlated output; and
determining a Doppler frequency shift based on the first and second correlated outputs.

16. The method of claim 15, further comprising determining a ratio of a peak of the first correlated output to a peak of the second correlated output.

17. The method of claim 16, wherein determining the Doppler frequency shift comprises determining the Doppler frequency shift based on the ratio.

18. The method of claim 15, further comprising calculating the first decimation ratio based on at least one of a frequency of the transmit signal, a clock frequency for the first and second correlators, a first relative velocity, or a second relative velocity.

19. The method of claim 15, further comprising calculating the first decimation ratio based on a frequency of the transmit signal, a clock frequency for the first and second correlators, a first relative velocity, and a second relative velocity.

20. The method of claim 19, wherein the first relative velocity is a positive value, and the second relative velocity is a negative value.

* * * * *